(12) United States Patent
Valenzuela et al.

(10) Patent No.: US 11,363,087 B2
(45) Date of Patent: Jun. 14, 2022

(54) LEVERAGING MICROSERVICES TO ORCHESTRATE MEDIA WORKFLOWS IN THE CLOUD

(71) Applicant: Disney Enterprises, Inc., Burbank, CA (US)

(72) Inventors: Jaime Arturo Valenzuela, Redondo Beach, CA (US); Thanh Hai Nguyen, Baldwin Park, CA (US); Paul Michael DiLoreto, Los Angeles, CA (US); Sergey Arturovich Sarkisyan, Los Angeles, CA (US); Devanathan Sattanathan, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 46 days.

(21) Appl. No.: 16/420,691

(22) Filed: May 23, 2019

(65) Prior Publication Data

US 2019/0364081 A1    Nov. 28, 2019

Related U.S. Application Data

(60) Provisional application No. 62/676,176, filed on May 24, 2018.

(51) Int. Cl.
*H04L 29/06* (2006.01)
*H04L 29/08* (2006.01)
*H04L 65/60* (2022.01)
*H04L 67/63* (2022.01)
*H04L 67/133* (2022.01)

(52) U.S. Cl.
CPC .......... *H04L 65/602* (2013.01); *H04L 67/327* (2013.01); *H04L 67/40* (2013.01)

(58) Field of Classification Search
CPC ...... H04L 65/602; H04L 67/327; H04L 67/40
See application file for complete search history.

(56) References Cited

U.S. PATENT DOCUMENTS

| 9,170,915 | B1 * | 10/2015 | Fateev | G06F 9/5038 |
| 9,183,065 | B1 * | 11/2015 | Shanker | H04L 63/10 |
| 2008/0126958 | A1 * | 5/2008 | Louie | G06F 3/0481 715/764 |
| 2010/0125826 | A1 * | 5/2010 | Rice | G06F 16/9535 717/107 |
| 2016/0103559 | A1 * | 4/2016 | Maheshwari | G06F 3/0481 715/738 |
| 2016/0124742 | A1 * | 5/2016 | Rangasamy | H04L 41/0803 717/103 |
| 2016/0316172 | A1 * | 10/2016 | Jaynes | H04N 7/147 |

(Continued)

*Primary Examiner* — William G Trost, IV
*Assistant Examiner* — Monishwar Mohan
(74) *Attorney, Agent, or Firm* — Farjami & Farjami LLP

(57) ABSTRACT

A method and system provide the ability to orchestrate a media workflow using a computer system. A payload for an application programming interface (API) to be utilized to process media content is determined. The payload is parsed to display one or more variables of the payload in a graphical user interface. The variables are mapped to webform user interface elements. A job of the media workflow is executed. During execution, a webform of the user interface elements is programmatically generated and presented to an operator, data for the payload is received via the webform, and the received data is provided to the API to process the media content.

20 Claims, 15 Drawing Sheets

(56) References Cited

U.S. PATENT DOCUMENTS

| | | | |
|---|---|---|---|
| 2017/0201413 A1* | 7/2017 | Marinelli | H04L 41/22 |
| 2017/0274693 A1* | 9/2017 | Aronoff | H04N 1/32256 |
| 2018/0081994 A1* | 3/2018 | Ron | G06F 8/20 |
| 2018/0314549 A1* | 11/2018 | Chokkalingam | H04L 41/5051 |
| 2019/0306045 A1* | 10/2019 | Avdesh Khanna | G06F 9/5072 |

* cited by examiner

LEVERAGING MICROSERVICES TO ORCHESTRATE MEDIA WORKFLOWS IN THE CLOUD

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 62/676,176, filed on May 24, 2018, with inventor(s) Jaime Arturo Valenzuela, Thanh Hai Nguyen, Paul Michael Diloreto, Sergey Arturovich Sarkisyan, and Devanathan Sattanathan, entitled "LEVERAGING MICROSERVICES TO ORCHESTRATE MEDIA WORKFLOWS IN THE CLOUD,".

BACKGROUND OF THE INVENTION

1. Field of the Invention

The present invention relates generally to media supply chains, and in particular, to a method, apparatus, system, and article of manufacture for utilizing microservices to create media pipelines that dynamically create webforms and orchestrate service calls.

2. Description of the Related Art

Media content owners/producers (e.g., film/television production studios such as $20^{TH}$ CENTURY FOX and/or DISNEY) have a long tradition of asset protection and archiving. A digital media archive (DMA) in the prior art originated using an on-premises linear tape-open (LTO) storage and an "enterprise" workflow solution. Such a solution required large capital investment, continuous maintenance and support, significant (yet unreliable) power and cooling, highly specialized software development and engineering staff. Further, the rigid structure of the solution resulted in high cost, lost innovation, and technical debt. The prior art DMA solutions slowly evolved to a cloud based native architecture with serverless workflows. However, such evolved solutions required the manual coding and establishment of workflows by an engineering team. With such a system, there was a need for a mechanism that would empower administrators/engineering staff to create and modify workflows themselves. A more detailed description of these problems may be useful to better understand the prior art issues.

Prior art DMAs utilize servers, databases, storage, LTO, workflows, and transcoding applications and media management software that are on-premises and hard to scale. Further, the on-premises software infrastructure needed to support the DMAs are heavy, expensive, and hard to maintain. In addition, the prior art systems utilized power and cooling systems that were unreliable. While prior art media production applications minimized data entry at the operator level, such systems were discrete, tool based, thick clients that relied on a manually driven workflow. In this regard, adding simple features to the software tools required software development and identical features would have to be developed for multiple software tools due to their siloed architecture. As a result (and due to complicated and time consuming deployment processes), development, quality assurance, and production environments were inconsistent—prior art systems separated software development and engineering teams creating disorganization and unnecessary friction. Further, experienced and expensive engineering staff were required to maintain and support application based infrastructure and software tools instead of focusing on strategic projects to support other business units.

SUMMARY OF THE INVENTION

Embodiments of the invention overcome the problems of the prior art using a microservice application architecture that consists of REST (Representational State Transfer) web services that provide a very specific result by performing a very specialized computation. These service calls often need to be orchestrated and require input data that users must enter in a webform. Because of the specialized nature of microservices, many service calls need to be executed for a single workflow to complete. That means that many webforms might need to be created for users to input necessary parameters. Further, microservices should be called in a particular sequence if the output of one service is needed as input for another. Embodiments of the invention provide various components that allows non-engineers and non-programmers) to create media pipelines that dynamically create webforms and orchestrate service calls.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
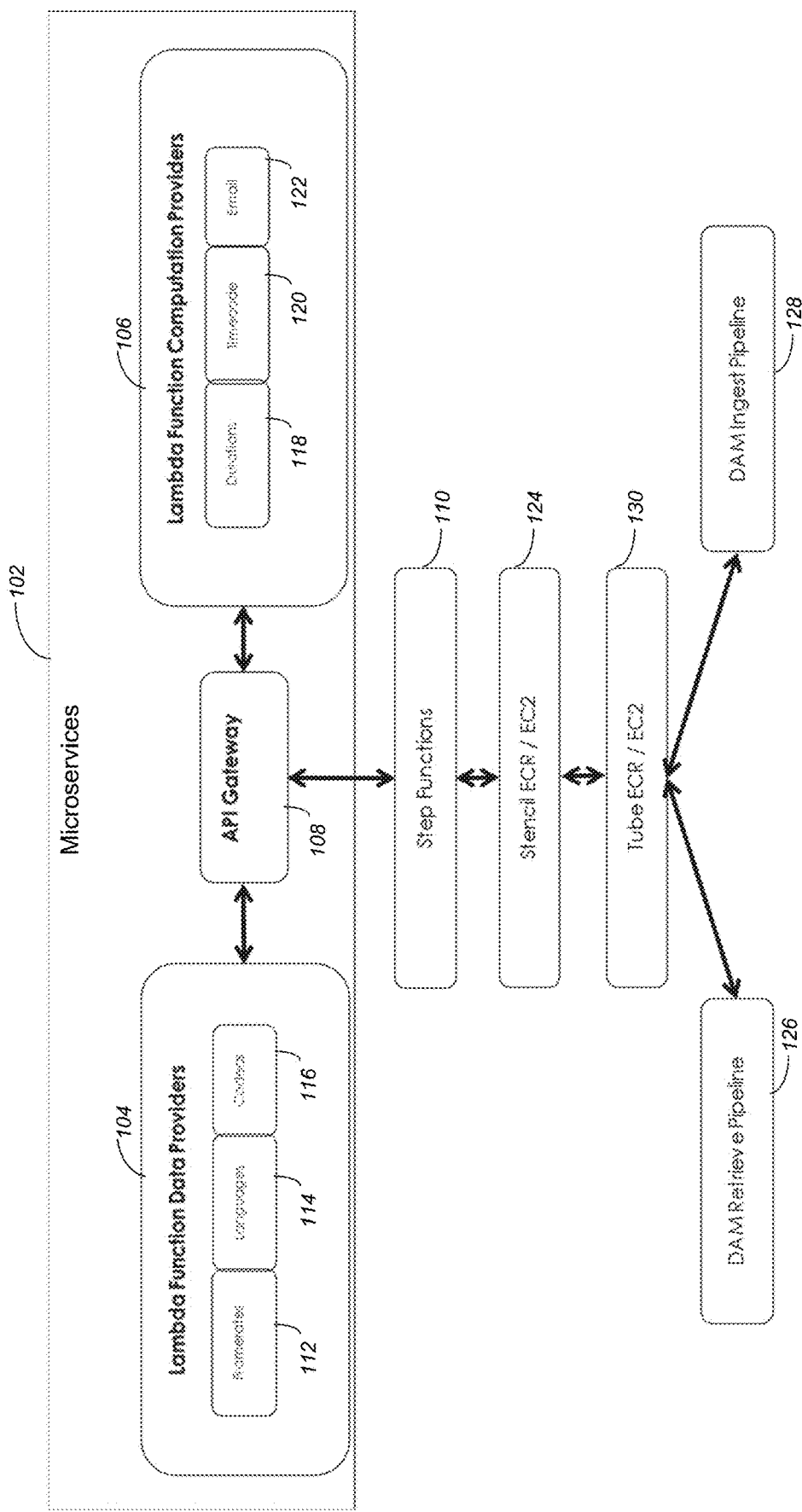
FIG. 1 illustrates an overview of the architecture for migrating, ingesting, and restoring media content assets in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

INTRODUCTION

Cloud technology has contributed many innovations in serverless application architecture that facilitates microservice deployment and use. Because it is easy to deploy hyper-focused microservices, applications now have to integrate and orchestrate many rest calls to complete a job. Embodiments of the invention provide a suite of applications to stream line the creation of webforms (referred to herein as the STENCIL application), the orchestration of processes (referred to herein as the TUBE application) to archive and restore media content/assets. The STENCIL application allows the mapping of JSON (JavaScript object notation) data fields to webform elements like textboxes, dropdowns, checkboxes, etc. These webforms are rendered as part of a workflow where a user needs to provide data for a job. Such workflows are defined as a sequence of steps that can be executed by a computer or a human and are defined and configured in the TUBE application as a pipeline.

In view of the above, embodiments of the invention:
provide serverless, cloud native workflows and microservices to replace the prior art rigid on-premises workflow software;
deploy and maintain a consistent infrastructure in all environments (e.g., using TERRAFORM);
replace expensive and support-heavy on-premises databases, applications, workflow software, and storage;
provide applications that empower users and administrators to map APIs (Application Programming Interfaces) and dynamically generate webforms;
provide a pipeline automation framework that replaces tool based/operator driven media manufacturing;
provide automated application testing and release process from a software repository; and
co-locate and integrate the engineering and software teams and formalize a development operations team to collaboratively provide direct support for production users.

Terminology

Media Workflows

As used herein, a media workflow is a series of steps that are carried out to catalog, transform or deliver media. These workflows are then optimized for ease of use and throughput into a pipeline. A pipeline is a workflow with normalized inputs and outputs for which throughput and ease of use are optimized. Jobs are instances of pipelines that are performed to a specific version of a given media title. Hundreds of jobs may be running in a media content owner facility everyday 24/7 to keep up with business demands.

Microservices

To optimize the media workflows, embodiments of the invention provide a solution (the TUBE application) to create, modify and manage different pipelines. Pipelines invoke reusable and scalable microservices through REST API (application program interface) calls in a specific order to aggregate and transform any data necessary to execute a given job.

With hyper-focused microservices, embodiments of the invention decouple functionality (e.g., from applications into hyper-focused microservices). There are two categories that are available to be orchestrated in parallel or in series: (1) data providers; and (2) computation/function providers. The first group provides technical or title metadata required to identify and transform media correctly—aspect ratios, framerates, language codes, audio configurations etc. This first group/category retrieves the data from individual collections (e.g., from no SQL databases) and uses the data to cascade necessary information to another service or display in a form for user selection. For example, data providers are used to populate dropdowns or match data fields with values for framerates, ISO language codes, or audio configurations (e.g., 5.1 surround, 2.1 stereo, immersive sound profiles, etc.).

The second group (i.e., function providers) performs content/asset functionality such as string manipulation (e.g., parsing file names or IDs), file naming, timecode calculations, framerate conversions, etc. In the second group, data may need to be supplied and tasks may need to be carried out by operators.

One goal of microservices is to empower operators to be focused on the most valuable resource for media content owners—the content. This may be achieved by querying these services to compute, derive, or fetch data in order to reduce operator data entry.

Architecture Overview

FIG. 1 illustrates an overview of the architecture for migrating, ingesting, and restoring media content assets in accordance with one or more embodiments of the invention. Serverless auto scalable microservice 102 enable the deployment of functionality quickly using infrastructure as a service. Lambda based microservices 104 and 106 are accessed via API gateway 108 and orchestrated with step functions 110. As used herein, a Lambda microservice is any service that allows code to be run without provisioning or managing servers (i.e., the operator/administrator only pays for the compute time consumed—there is no charge when code is not running). With Lambda, code can be run for a variety of applications or backend services with no administration (code is uploaded and the Lambda service takes care of everything required to run and scale the code with high availability).

As described above, the two categories of microservices are data providers 104 and computation providers 106. The data providers 104 provide technical or title metadata such as framerates 112, language codes 114, and codecs 116 (e.g., a program for encoding or decoding a digital data stream or signal). In this regard, data providers 104 provide text and numeric values to display for user selection or used in computations.

The computation providers 106 perform computations in one place and guarantees that the same formula and specifications are used for all applications. The computation providers 106 perform computations such as determining durations 118, timecode calculations 120, and generate notification emails 122 to users.

The STENCIL application 124 renders webforms when required by a pipeline 126-128. DAM (digital asset management) retrieve/restore pipeline 126 and DAM ingest pipeline 128 are created and managed in the TUBE application 130. The process to create a pipeline begins by defining the steps to orchestrate. However, prior to creating a pipeline 126-128, one should know if user input is required and a stencil/template 124 should be created for such user input. The restoration/retrieval pipeline 126 does not require direct user input to start a job as they are triggered via APIs. However, the ingest pipeline 128 may require operators to enter data. For such cases, embodiments of the invention provide the STENCIL application and framework that allows for webforms to be programmatically rendered as a step in a pipeline. The description below provides details regarding how to leverage the architecture of FIG. 1 to create pipelines 126-128 for a digital media archive.

Ingestion Pipelines
  User Input
    Overview

Microservices 102 provide scalability and flexibility, but they demand more software development work when users need to interact or provide required data as input to a pipeline (e.g., the ingest pipeline 128). Each of the ingestion pipelines 128 may need users to enter data and interact with webforms that are unique to the workflow. This data is consumed and used as input in a REST call. To avoid having to code specific webforms for each ingest pipeline 128, embodiments of the invention provide a solution (the STENCIL application) that generates webforms programmatically. The STENCIL application allows administrator users to map webform elements—i.e. textboxes, dropdowns or checkboxes—to a variable in a given REST API input. Administrators perform this mapping via a simple point and click process and are able to assign input validation, layout and styling. Instances of these programmatically generated webforms are presented to operators when executing a job in an ingest pipeline 128.

Details

Figure 2:
FIG. 2 illustrates a template management graphical user interface (GUI) in accordance with one or more embodiments of the invention.

Different workflows that may require different user input may be managed/stored in the form of a template. In this regard, a STENCIL application can support several web service endpoints via templates. Several templates can be stored for each application for a specific purpose. For example, an encoding template may provide recipes to make particular video and audio renditions. Each template provides a mechanism/capability to programmatically render web forms to allow data entry like source media paths, framerates, or selection of a code, for example. FIG. 2 illustrates a template management graphical user interface (GUI) 200 in accordance with one or more embodiments of the invention. The application that will be receiving/utilizing the user input may be selected in area 202. In FIG. 2, the VANTAGE workflows for the VANTAGE transcoding application have been selected and the different workflows/templates 204A-204N (collective referred to as workflow/template 204) are displayed. In the template management GUI 200, the user can select an option to edit/modify 206, to preview/test the rendered stencil form 208, or delete/remove 210 a particular named template workflow 204 that is identified by identifier 212.

Figure 3:
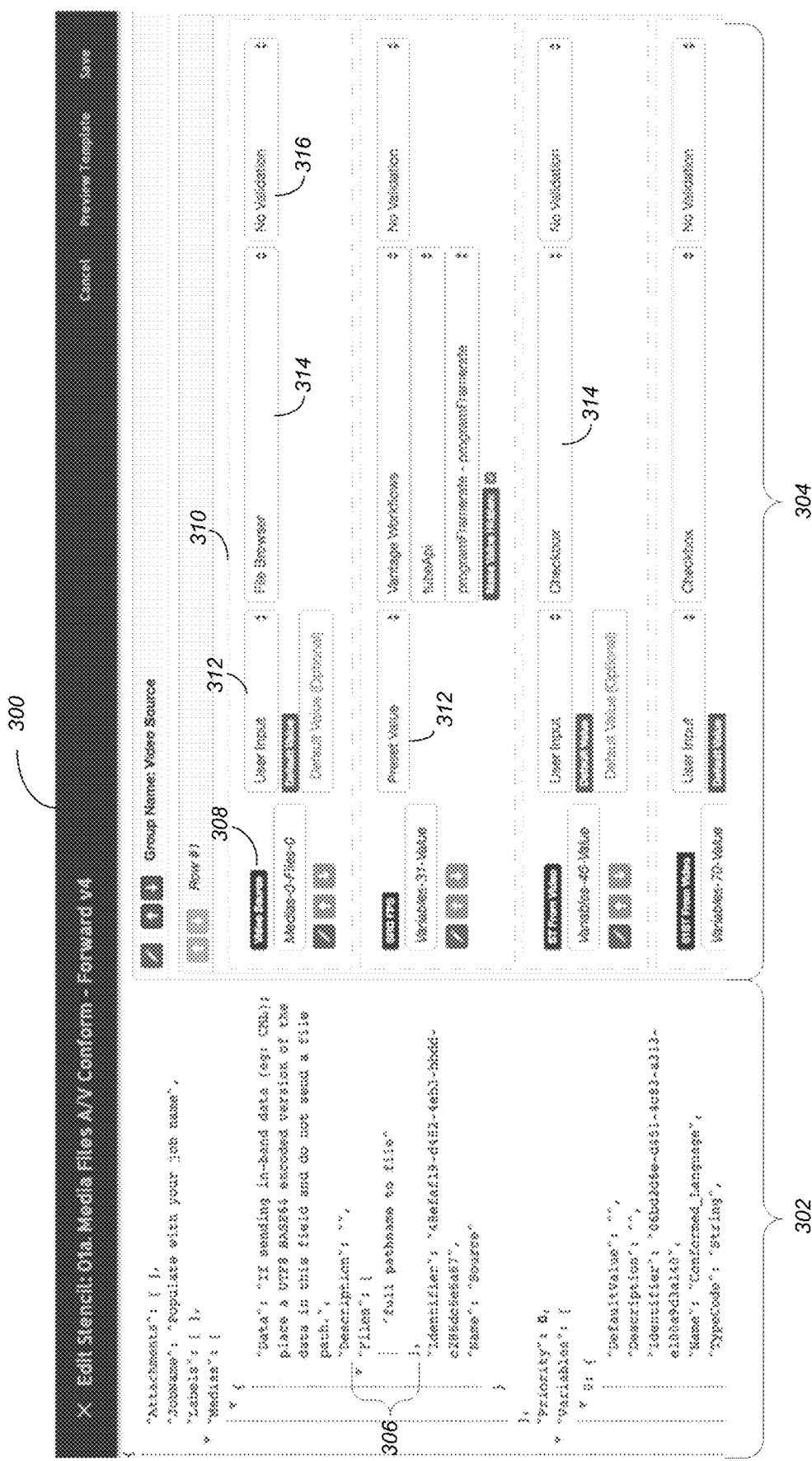
FIG. 3 illustrates a template modification graphical user interface utilized in accordance with one or more embodiments of the invention.

Once the edit/modify function 206 has been selected, template modification GUI of FIG. 3 may be displayed. Template modification GUI 300 consists of a left panel 302 that displays the JSON (JavaScript Object Notation) structure for an API payload. The JSON structure may be retrieved via a copy/paste from documentation or by querying a service itself (WADL—[Web Application Description Language]) (e.g., by specifying a path [e.g., a uniform resource locator (URL)] that can be used to query [via an API] an application for the data JSON objects/data needed by the application). In this regard, embodiments of the invention may parse the JSON code and format it for display in the left panel 302 (e.g., in a hierarchical tree/manner).

A workflow engineer begins by clicking on the value of a key-value pair. For example, in FIG. 3, the user may click on the Media:Files key value pair 306. The engineer may then be prompted to type in a group name or a label for the field to be rendered on the web form (e.g., "Video Source" 308). The template presents choices for the web element on the right pane 304 (e.g., area 310). The workflow engineer can choose to have an end-user input data or have present values populated from another service (e.g., via box 312). A workflow engineer can then select the type of input element via selection area 314. Types of input may include a text box, autocomplete, file browser, basic input, checkbox, dropdown, preset value, switch, timecode, or other widget. The file browser and timecode elements may be custom. Further, validation 316 can also be attached to that web element. In this manner, the JSON objects from the left panel 302 are mapped to webform elements 310 in the right panel 304 via a point and click mapping system.

Once the different JSON elements are mapped to the webform elements, an object is created that has one or more of the following components: group, properties (i.e. props), validator, and validation list. The group is a shortcut component to creating a material user interface expandable group and has some extra logic so that an autocomplete components menu displays it as it overflows. The properties may be Boolean, string, or other types of properties. The validator includes parameters that take an object and used internally to return an error message or an empty string if the value passed is valid. The validation list is useful for exposing currently developed validation functions and key/value are used as the function's name and a label to display it. The validation list may include checks for a valid email address, specific tokens in the source file name, valid file paths or URLs and to enforce that the user enters required data.

With a created object, embodiments of the invention are capable of rendering the webform (represented by the object) programmatically. The object defines keys to manage and identify the template/stencil itself and a source map that contains the web elements to JSON mapping. Further, some styling data along validation and input components may be included. In this regard, once a template is complete and the object is saved in a database for a given application, the template can be rendered in a web application. The webform can be used by operators to submit video/audio encoding jobs to create specific renditions for a television show or movie.

Figure 4:
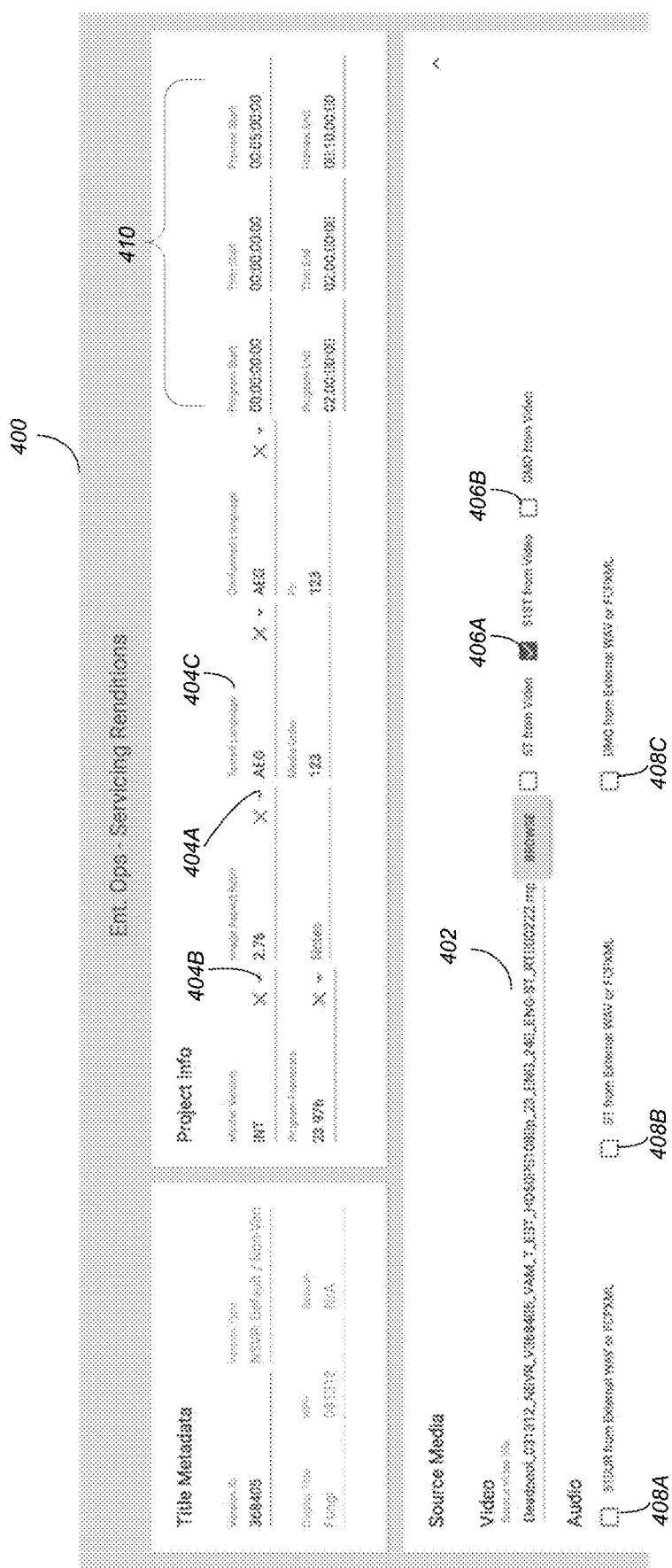
FIG. 4 illustrates a rendered webform in accordance with one or more embodiments of the invention.

FIG. 4 illustrates a rendered webform 400 in accordance with one or more embodiments of the invention. A file browser component 402, dropdowns 404A-404C with prepopulated values for image aspect ratio 404A, autocomplete for language codes that are retrieved from a data provider microservice 104, checkboxes 406A-406B and 408A-408C for codecs (e.g., 406A and 406B), and audio types (408A-408C), and custom timecode elements 410. Title metadata fields are populated with values from a data provider service 104. The webform 400 will render in a given step in a pipeline.

Orchestration

Media workflows contain tasks that run for unknown periods of time. One of the challenges to combine microservices with templates and manage the data flow in the execution of the pipeline is having to wait for operators to fill out forms when required and to allow for long running processes to run without timing out. The TUBE application keeps track of the state of each task for every job running across any and all pipelines. It stores the status and result of any task in a pipeline throughout its execution. The TUBE application has mechanisms to presents users with a template/STENCIL generated webform and wait for input. It also has the ability to submit long running tasks into simple queues and wait for the result to come back to continue the job execution. State and results are presented to operators in a dashboard for all running jobs. Operators also have the ability to search the final state of any past pipeline executions.

An exemplary system for orchestrating calls to microservices in the TUBE application utilizes Step Functions in AWS (AMAZON WEB SERVICES). Step Functions are designed to track state and easily define any desired sequence to execute and cascade data through the pipeline. It stores the state and results for all tasks in its own data collection. With the stored data, operators are able to step back in a workflow to recover from errors or modify input data.

Figure 5:
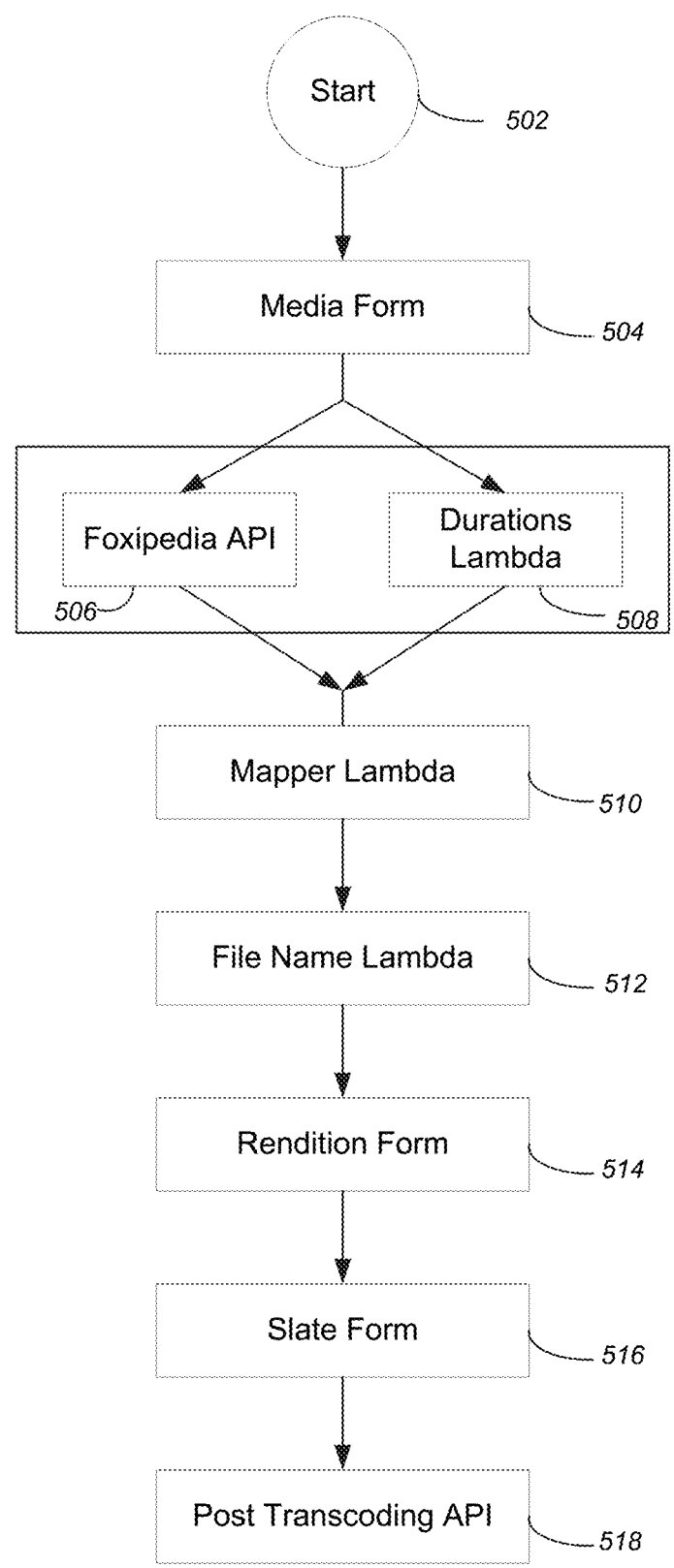
FIG. 5 illustrates the logical flow for exemplary step functions to acquire metadata with user input for transcoding in accordance with one or more embodiments of the invention.

FIG. 5 illustrates the logical flow for exemplary step functions to acquire metadata with user input for transcoding in accordance with one or more embodiments of the invention. The process starts at 502. Throughout the process, three webforms are presented to the operator to select source media and other parameters. The media form 504 enables the operator to select the source media, validate title metadata and enter technical information, trim values, media order numbers and select the language to be rendered. The user browses for the source media and selects other parameters and sends the data to a few lambda services 506-608 (e.g., a timecode calculator to obtain durations). In this regard, based on the input in the media form 504, title metadata may be queried from a media content information database 506 and duration calculations may be requested from a Lambda function 508 for different framerates. The mapper Lambda 510 maps the data to a particular workflow.

A file name Lambda 512 may be used to extract tokens from source file names. The rendition webform 514 is used to acquire/select additional information for the transcoding operation (e.g., metadata about the particular rendition). In this regard, the rendition webform 512 displays lambda service results and lets the operator select presets for electronic sell-through, television distribution, etc.

The slate webform 516 displays the slate information (e.g., name, version, aspect ratio(s), audio channel information, durations, etc.) that will be rendered as a PNG file to be attached at the head of the video if required (e.g., by the preset). Operators can view and edit to correct mistakes in the data displayed in the slate webform. When an operator clicks submit, the payload may be posted to a transcoding API 518.

Pipeline Creation and Orchestration

As described above, pipelines for different workflows may be created and managed in the TUBE application. To create and manage a pipeline, a pipeline is created (e.g., an ingest pipeline) and one or more stencils/templates are attached to the pipeline. Multiple stencils/templates may be attached in a defined order. Once created, the resulting pipeline may then be used by an operator/end-user to create an actual job for processing media content (e.g., a transcoding operation).

Figure 6:
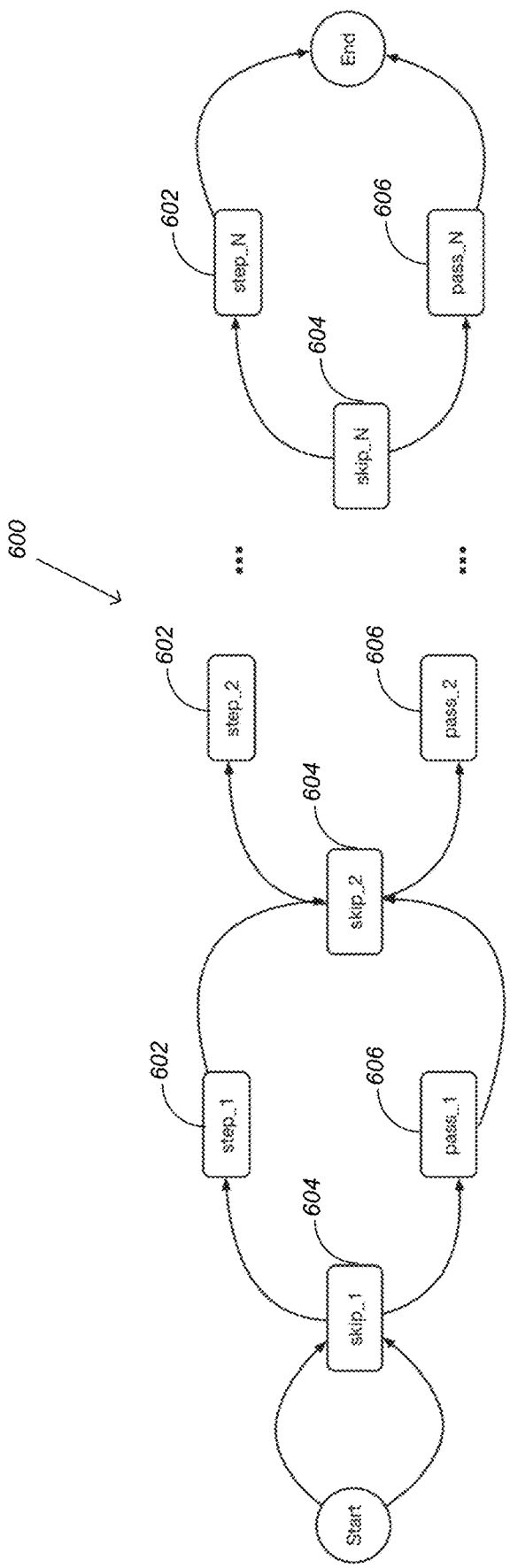
FIG. 6 illustrates a generic state machine definition that is used to construct a pipeline dynamically in accordance with one or more embodiments of the invention.

Returning to the pipeline creation process, once a stencil/template has been attached, the steps and orchestration of the pipeline are defined. The orchestration consists of creating/utilizing a basic state machine definition (e.g., in AWS Step Functions). FIG. 6 illustrates a generic state machine definition that is used to construct a pipeline dynamically in accordance with one or more embodiments of the invention. The basic state machine 600 may be generic with steps 602 that can be skipped (via skip 604 (which passes the step via pass 606 or performs the step 602) or retried from a framework via a dashboard within the TUBE application. An instance of this state machine is invoked when the operator submits a job by passing an execution ID and payload data (and a new job record is created in the TUBE application for tracking).

Figure 7:
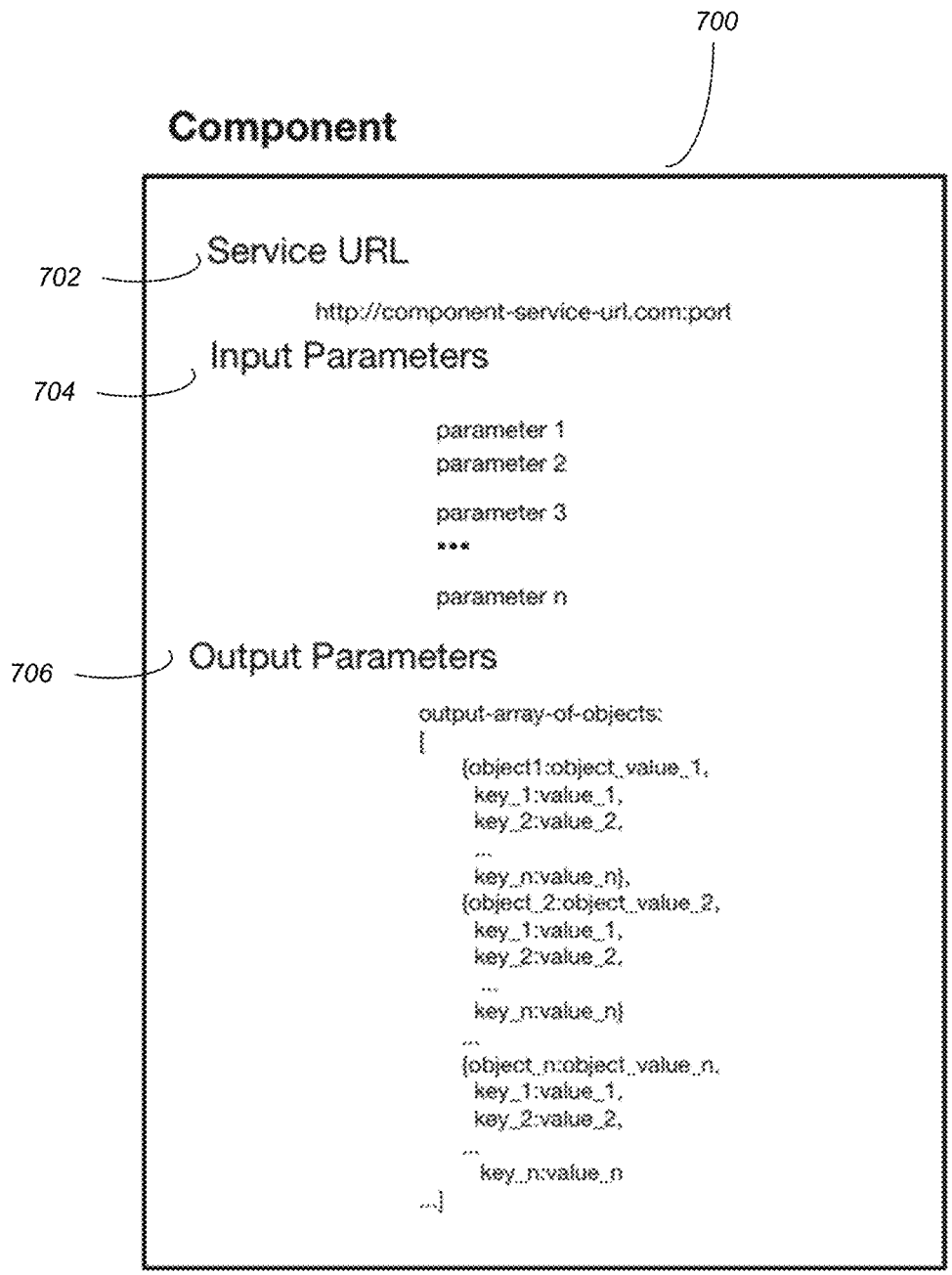
FIG. 7 illustrates a generic component structure that may be utilized in accordance with one or more embodiments of the invention.
Figure 8:
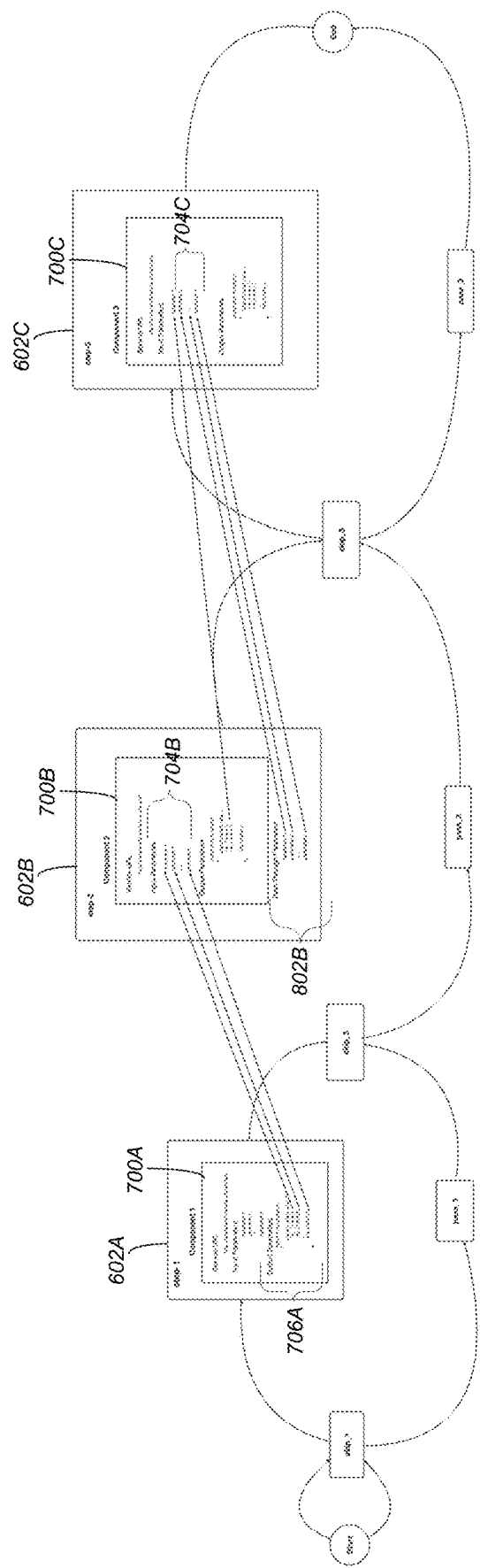
FIG. 8 illustrates the assignment of generic tasks to steps in accordance with one or more embodiments of the invention.

To create a specific state machine, tasks may be assigned to the steps 602. via various components. FIG. 7 illustrates a generic component structure that may be utilized in accordance with one or more embodiments of the invention. As illustrated, the component structure includes the microservice URL 702 for the component, input parameters 704, and output parameters 706 (e.g., key-value pairs). The tasks defined in a component 700 may then bas assigned to each step 602. FIG. 8 illustrates the assignment of generic tasks to steps in accordance with one or more embodiments of the invention. As illustrated, various components 700A-700C have been assigned to steps 602A-602C. Further, the data flows from the output parameters (e.g., output parameters 706A) of one component (e.g., component 700A) and serve as/constitute the input parameters (e.g., input parameters 704B) of the subsequent component (e.g., component 700B). Similarly, parameters may be passed through (e.g., parameters 802B) from one step (e.g., step 602B) to serve as input parameters (e.g., input parameters 704C) in a subsequent component (e.g., component 700C).

Figure 9:
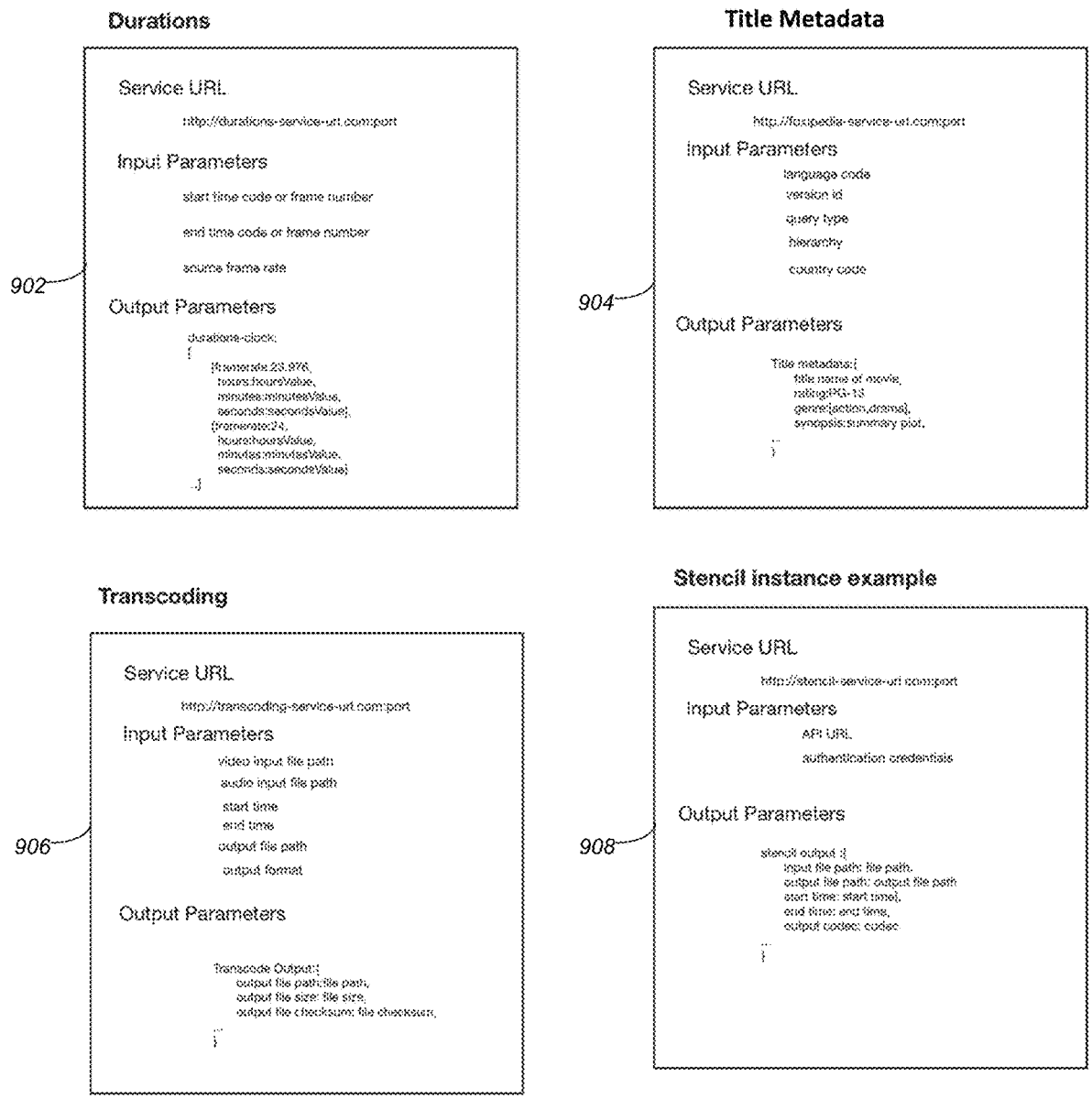
FIG. 9 illustrates exemplary specific component definitions that may be utilized in accordance with one or more embodiments of the invention.

In specific embodiments, the generic component definitions of FIG. 7 may be specifically defined. FIG. 9 illustrates exemplary specific component definitions that may be utilized in accordance with one or more embodiments of the invention. As illustrated, exemplary component definitions may include durations 902, title metadata microservice 904, transcoding 906, and a stencil instance example 908. Durations 902 may include input parameters of the start time code/frame number, end time code/frame number, and source frame rate. Output parameters of the durations example 902 may include computed durations based on the input parameters. The title metadata component definition 904 may include input parameters of the language code, version ID, query type, hierarchy, and country code, with the output parameters providing title metadata such as the name of the movie, rating, genre, synopsis, etc.). The transcoding component definition 906 may include input parameters of the video input file path, audio input file path, start time, end time, output file path, and output format, with the output parameters including the output file path name, size, checksum, etc. Lastly, the stencil instance example component definition 908 may include input parameters of an API URL and authentication credentials, with output parameters of the input file path, output file path, start time, end time, codec, etc.

To provide a non-generic state diagram, the components 700A-700C in FIG. 8 may be replaced by any of the components 902-908 of FIG. 9.

Details regarding an exemplary creation of a pipeline with step functions 602 follow. To create a pipeline with step functions 602 (e.g., that models the generic state machine definition 600), a controller object (with a key to function pairs that can return either promises or straight results) and a configuration object (e.g., an AWS config object) may be used to create an instance of a Stepr environment object. A start agent may then be utilized to perform an assigned activity and post status information to a database (e.g., within or provided by the TUBE application). To start a job, an object is created and an identification for the state machine to be invoked is passed to the object. In a specific example, steps within a state machine may include:

Step 0: a unique workflow ID instance along with instructions to be executed on each step in the state machine;

Step 1: parsing a quality control report that is associated with a media asset;

Step 2: parsing an actual file name to extract content owner specific tokens;

Step 3: extracting technical metadata from the media file; and

Step 4: mapping the content owner specific token data obtained in step 2 to remove unnecessary text (e.g., a letter "V") from the token and querying a media content owner information database (e.g., a title metadata system/microservice) to obtain title metadata.

The status and state of each step in the state machine may be stored in a database associated with the TUBE application, and task failure/success messages may be forwarded to the appropriate step functions. This functionality is managed by a mission control application.

In view of the above, to track instances of a pipeline (job), step 0 includes the instructions for each step including: the task to be performed like invoking a service as specified in the controller; the parameters for the task like a required ID or a key-value pair; information regarding whether a step is to be skipped or not; an optional mapper object that rearranges data to be passed along; and optional flags that specify a method in the controller object.

In view of the above, embodiments of the invention provide a mechanism for creating workflows that follow a generic state machine where the steps to be executed in the generic state machine may be programmatically updated in real time.

Exemplary Media Archive Restore System

Overview

One or more embodiments of the invention provide a Media Archive Restore System (M.A.R.S.) that offers its users the ability to store, search and retrieve digital masters. MARS integrates with the TUBE application and STENCIL application to perform the Archiving (Ingest pipeline) and Restoring functionality (Retrieval pipeline).

When an operator starts an Ingest job, they must associate the media with basic title and technical metadata. There is an automated verification process that leverages the file name, media file analysis and QC reports to ensure that the files being archived are associated with the correct title and version. The Ingest pipeline also ensures that media files conform to a defined technical specification. A record is created for the media in the asset management system and other external systems are updated. Files are then copied simultaneously into an on-premises storage system and cloud for disaster recovery. There are checksum and video/audio proxy processes that take place in parallel. All these tasks are orchestrated microservice calls. The state and progress are presented to a user in a status dashboard and they are alerted if errors are encountered in the pipeline.

Once the media files are in the asset management system, users can search, browse and preview media via proxies. The entire contents of the archive is at the user's fingertips. The most common use-case is searching for a particular asset to be updated or restored. Once the desired asset is identified, operators will invoke the variant of the ingest pipeline to update or retrieval pipeline to restore the media and deliver it to a customer.

The retrieval pipeline restores the desired assets to a particular network storage location or transfers to an external facility or customer. This pipeline orchestrates calling a checksum, file naming and file moving microservices. The status dashboard presents the state and progress of the retrieval pipeline and alerts are displayed if errors occur.

Details

As described above, MARS provides the ability to store, search and retrieve digital masters. MARS integrates with the TUBE application and STENCIL application to perform the Archiving (Ingest pipeline) and Restoring functionality (Retrieval pipeline).

Figure 10:
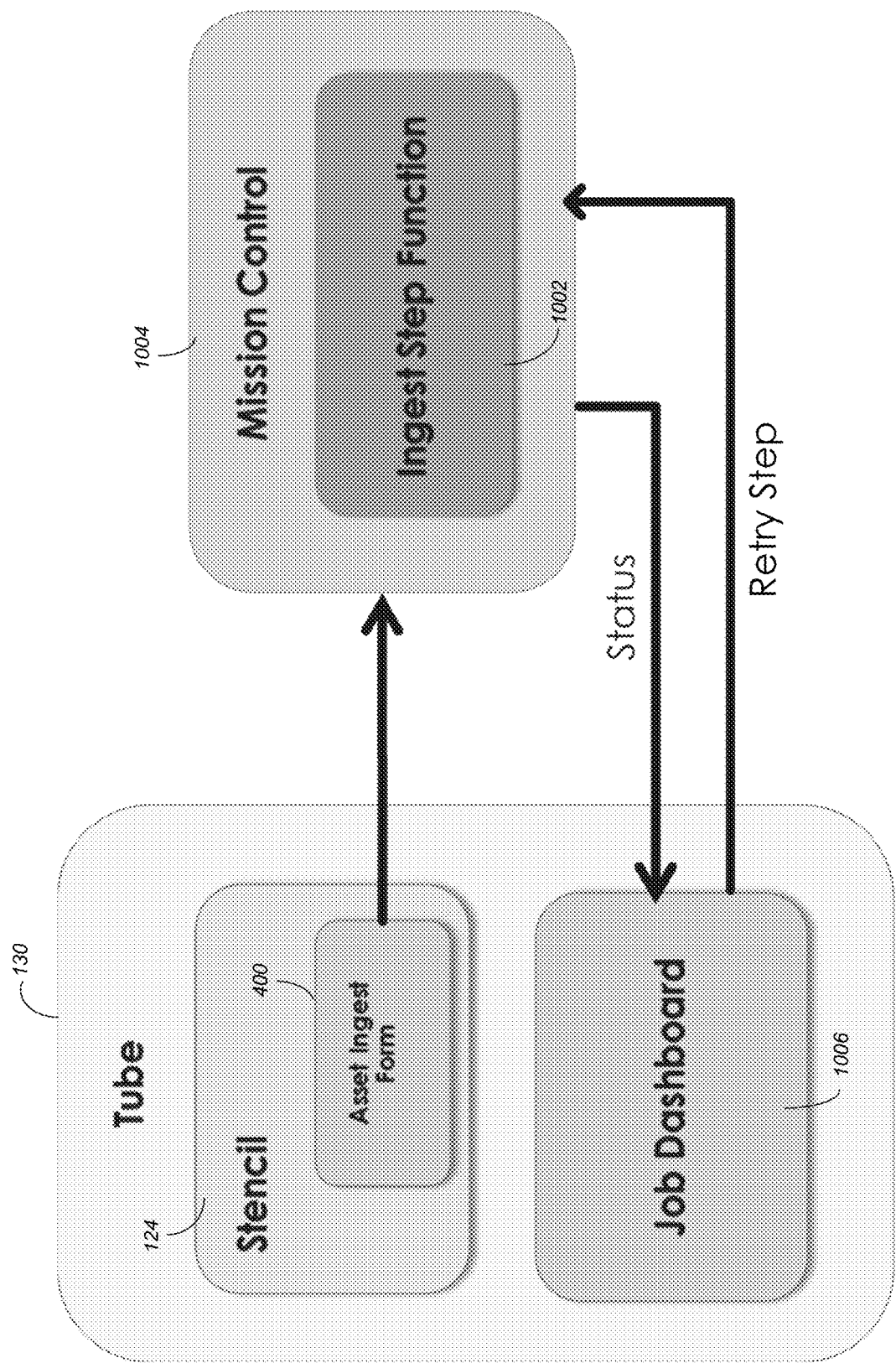
FIG. 10 illustrates the logical flow for ingesting assets into a DMA in accordance with one or more embodiments of the invention.

When an operator starts an Ingest job, they must associate the media with basic title and technical metadata. FIG. 10 illustrates the logical flow for ingesting assets into a DMA in accordance with one or more embodiments of the invention. The TUBE application 130 manages the different pipelines that include different stencils/templates 124. A stencil generated webform 400 (i.e., the asset ingest form 400 of FIG. 10) is presented to an operator when an asset is received. Submission of the form 400 creates an ingest job (an instance of the pipeline [e.g., an ingest step function 1002 in Stepr object]) that is managed by a mission control application 1004. In this regard, mission control application 1004 stores and passes the data to each step function 1002 and allows the operator to interact with the workflow/pipelines.

The status of each job may be displayed in a job dashboard 1006 of the TUBE application 130. The operator may retry any step in the ingest pipeline (step function) 1002 via mission control 1004.

Figure 11:
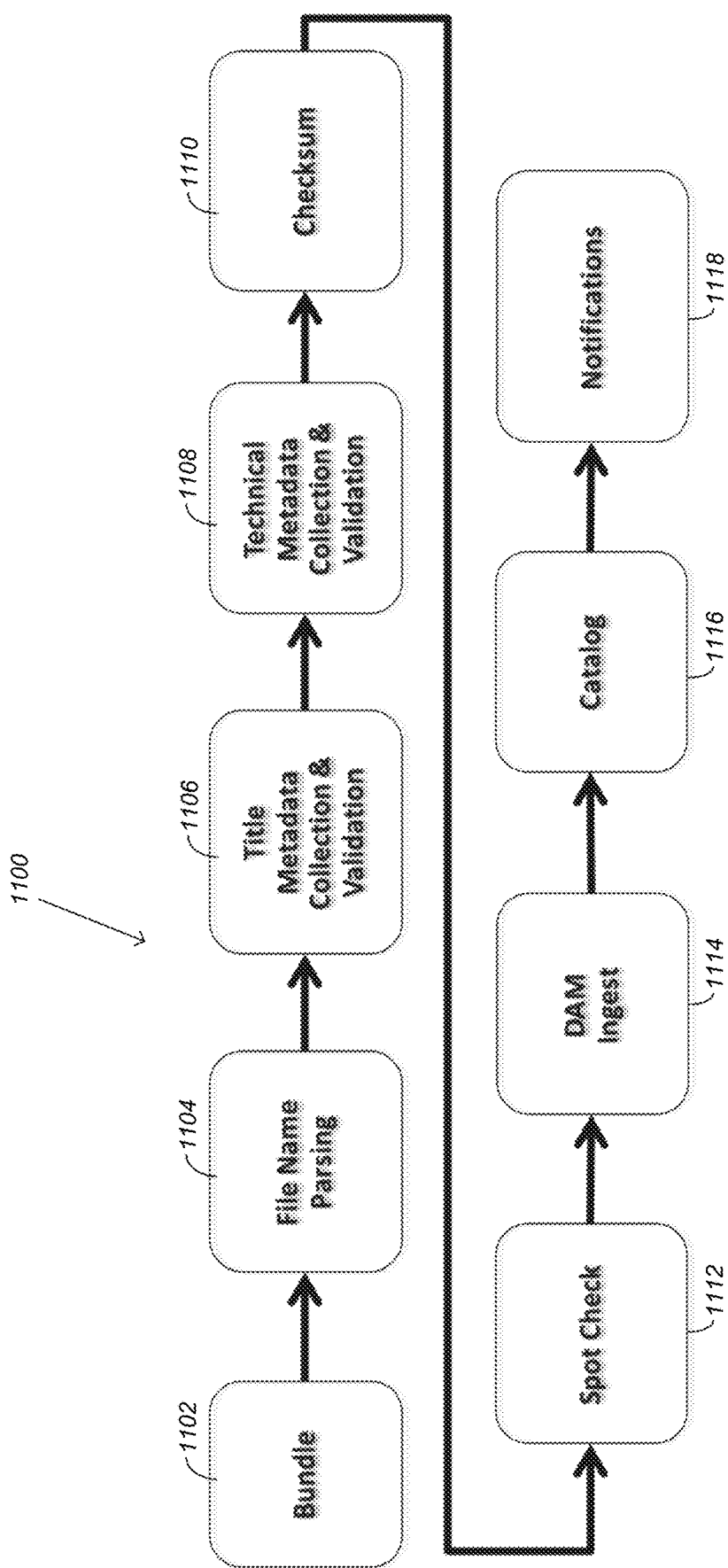
FIG. 11 illustrates the logical flow for ingesting assets in accordance with one or more embodiments of the invention.

FIG. 11 illustrates the logical flow for ingesting assets in accordance with one or more embodiments of the invention. The ingest pipeline 1100 consists of numerous templates 1102-1119 that are used to perform the ingest operation. A bundle is created at 1102 (multiple audio tracks for example). The file names are parsed at 1104. Title metadata collection and validation is performed at step 1106. In this regard, a strict file naming convention may be defined that needs to be verified and validated. Technical metadata collection and validation is performed (e.g., by extracting the metadata from the media file itself) at step 1108. At 1110, checksums are generated for the files. At step 1112, digital vault operators may be required to spot check the media to confirm that the correct media content is being ingested based on the information provided. At 1114, the media content/asset is ingested, catalogued at 1116, and notifications are generated and provided at 1118.

Triage and retries may be performed at any step in the workflow 1100. Further, when an asset is ingested at 1114, a video proxy workflow may also be triggered/utilized. A proxy workflow provides that a proxy is created for all assets and proxy jobs may be queued in SQS (e.g., AMAZON'S SIMPLE QUEUE SERVICE) with a consumer posting the job request to a lambda service to invoke a job to convert the media asset. When the proxy job completes, the proxy asset is attached to the original asset, and the ingest is complete.

Figure 12:
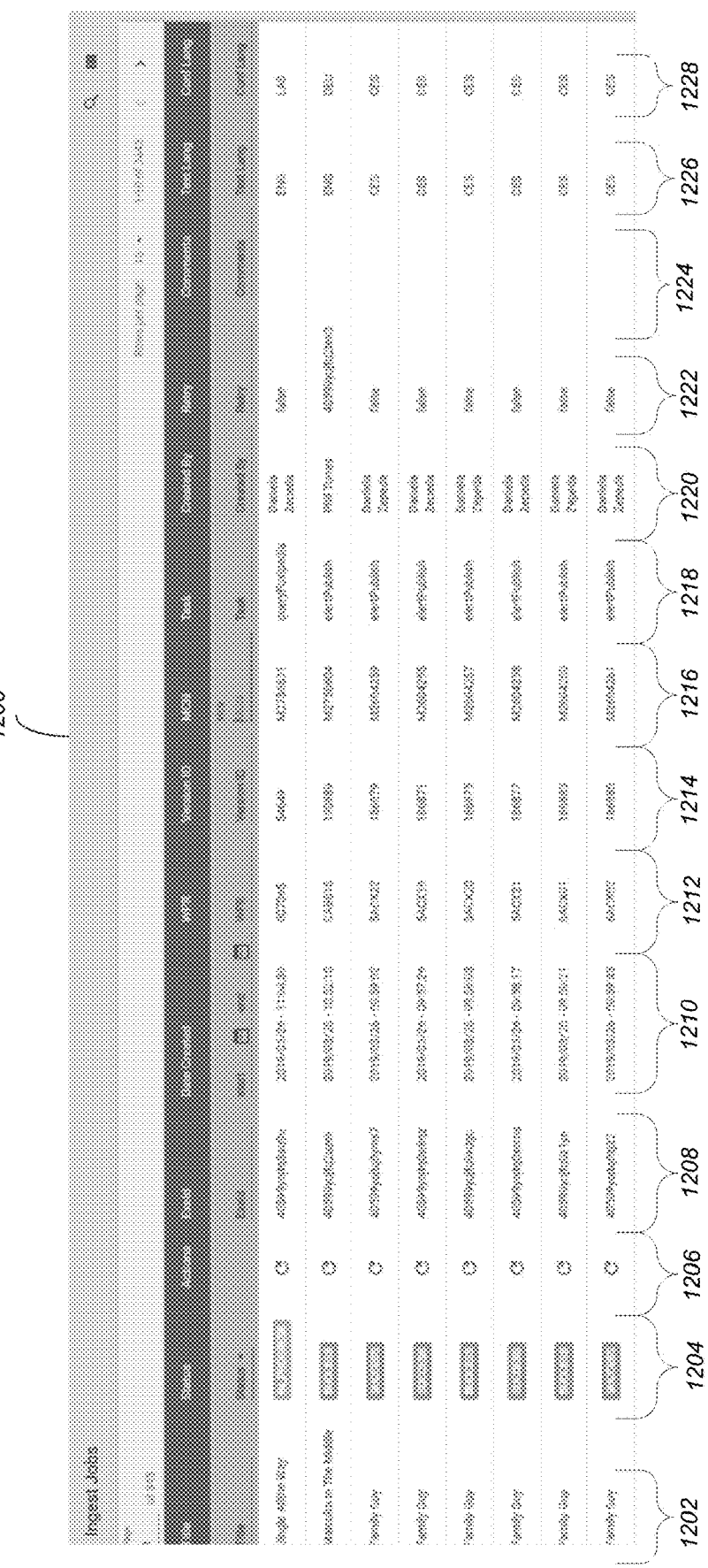
FIG. 12 illustrates an exemplary graphical user interface for an ingestion pipeline showing the status of various ingestion jobs within the TUBE application in accordance with one or more embodiments of the invention.

FIG. 12 illustrates an exemplary graphical user interface for an ingestion pipeline showing the status of various ingestion jobs within the TUBE application in accordance with one or more embodiments of the invention. As illustrated, columns in the ingestion pipeline GUI 1200 include the title of the asset 1202, the status 1204 indicating wither a job is in progress or has been successful completed, a refresh operation 1206, an execution ID 1208, the start and end dates of the job creation 1210, the world product registry (WPR) number 1212, the version ID 1214, the material control number (MCN) number 1216, the task 1218 within the job that is being performed, the operator 1220 that created the task, whether a retry 1222 was performed, comments 1224, the text language 1226, and the confirming language 1228. Other pipelines will likely have different columns in the TUBE dashboard. For example, the restoring assets pipeline, track shipment pipeline, transcoding pipeline, etc. all have different dashboards that are customized for the particular pipeline.

Logical Flow

Figure 13:
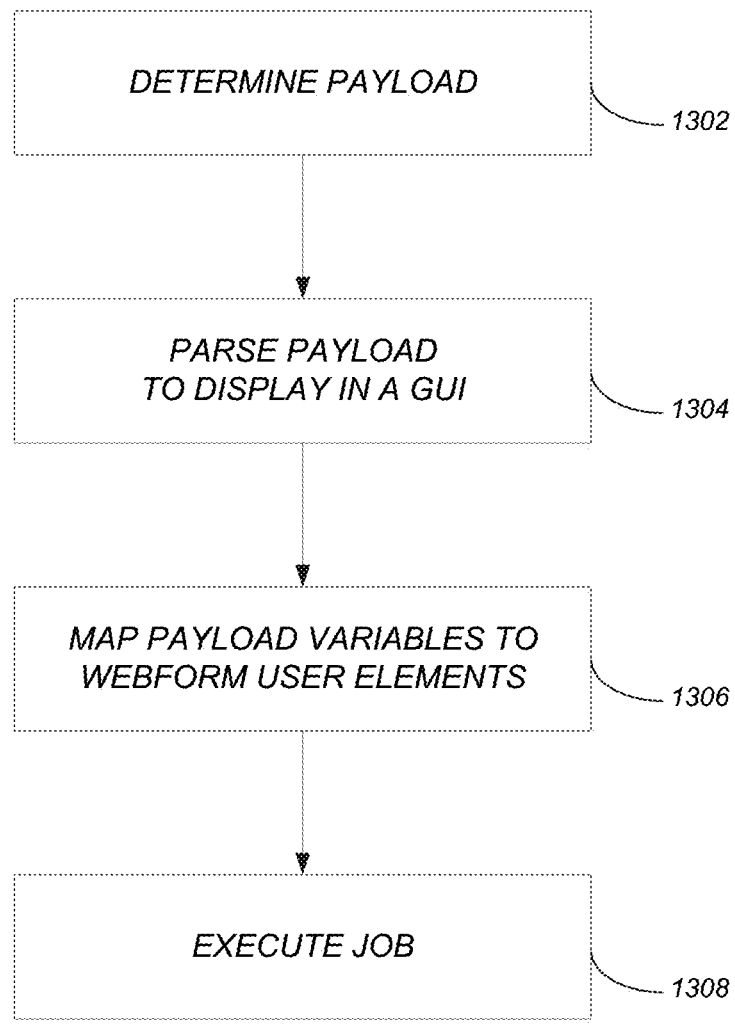
FIG. 13 illustrates the logical flow for orchestrating a media workflow using a computer system in accordance with one or more embodiments of the invention.

FIG. 13 illustrates the logical flow for orchestrating a media workflow using a computer system in accordance with one or more embodiments of the invention.

At step 1302, a payload for an API (to be utilized to process media content) is determined. To determine the payload, a cloud-based location for the API may be identified as a service at the location may be queried.

At step 1304, the payload is parsed to display the variables of the payload in a graphical user interface.

At step 1306, the variables of the payload are mapped to one or more webform user interface elements. The mapping may be performed via a point and click process and may further include assigning input validation, layout and styling.

At step 1308, the job of a media workflow is executed. During the executing: the webform is programmatically generated and presented to an operator, data for the payload is received via the webform, and the received data is provided to the API to process the media content. The data for the payload may be provided to the API by invoking reusable and scalable microservices that aggregate and transform the data for the payload.

The job execution may further include tracking a state of each task for the job, storing the state and result of teach task throughout execution of the job, and presenting the state and result in a dashboard for all executing jobs. Such a tracking may be performed by accepting submission of the job to be executed and upon submission, creating a new job record in a process orchestration application (e.g., the TUBE application), wherein the new job record stores the state and result. An instance of a state machine may also be invoked upon submission of the job. Such a state machine may include one or more component steps that can be skipped or retried form a step framework via the dashboard. Each component step may include a service URL, input parameters, and output parameters (where the input parameters of a second component step may consist of the output parameters of a first component step (e.g., a prior state in the state machine).

Hardware Environment

Figure 14:
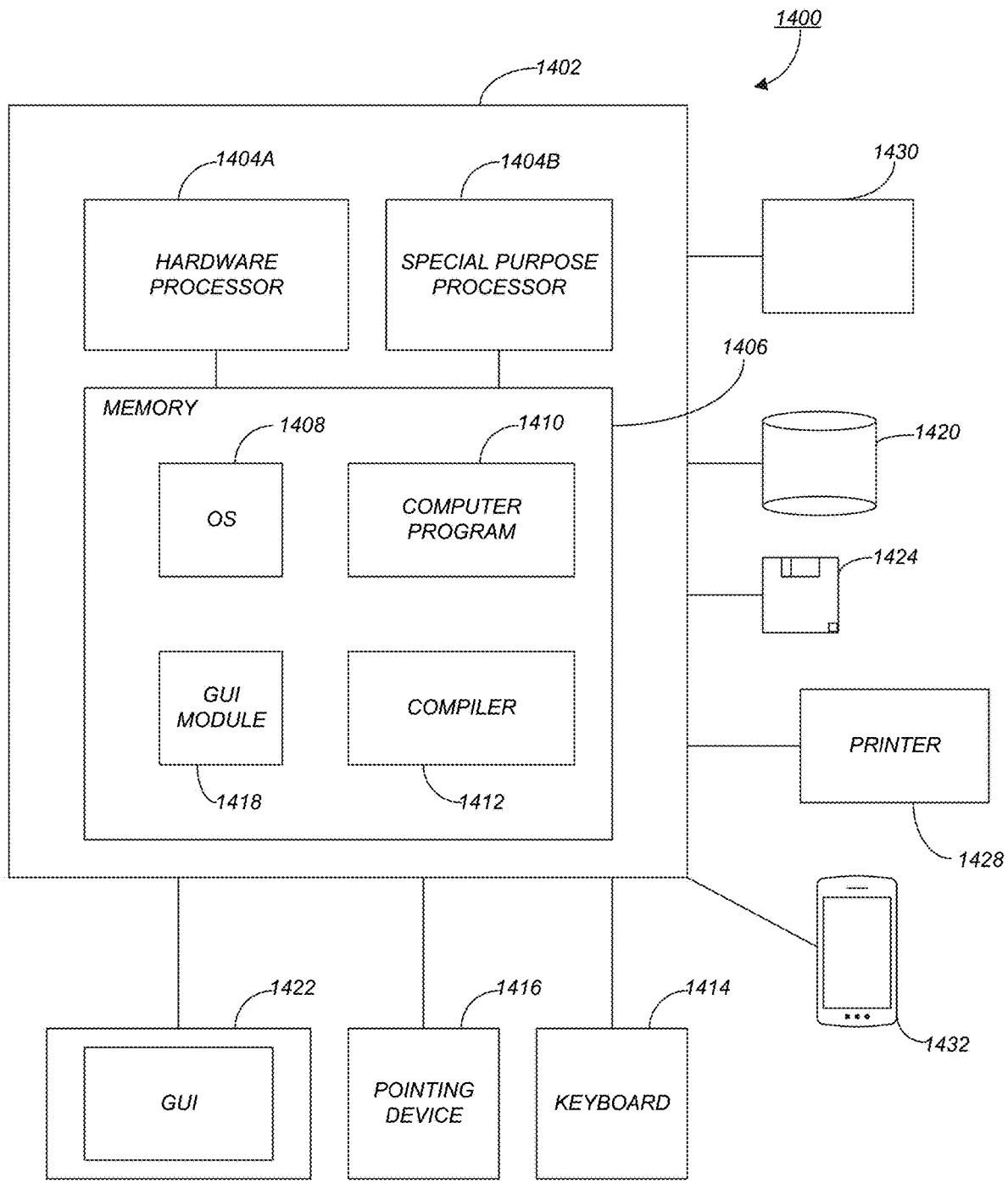
FIG. 14 is an exemplary hardware and software environment used to implement one or more embodiments of the invention.

FIG. 14 is an exemplary hardware and software environment 1400 used to implement one or more embodiments of the invention. The hardware and software environment includes a computer 1402 and may include peripherals. Computer 1402 may be a user/client computer, server computer, or may be a database computer. The computer 1402 comprises a hardware processor 1404A and/or a special purpose hardware processor 1404B (hereinafter alternatively collectively referred to as processor 1404) and a memory 1406, such as random access memory (RAM). The computer 1402 may be coupled to, and/or integrated with, other devices, including input/output (I/O) devices such as a keyboard 1414, a cursor control device 1416 (e.g., a mouse, a pointing device, pen and tablet, touch screen, multi-touch device, etc.) and a printer 1428. In one or more embodiments, computer 1402 may be coupled to, or may comprise, a portable or media viewing/listening device 1432 (e.g., an MP3 player, IPOD, NOOK, portable digital video player, cellular device, personal digital assistant, etc.). In yet another embodiment, the computer 1402 may comprise a multi-touch device, mobile phone, gaming system, internet enabled television, television set top box, or other internet enabled device executing on various platforms and operating systems.

In one embodiment, the computer 1402 operates by the hardware processor 1404A performing instructions defined by the computer program 1410 under control of an operating system 1408. The computer program 1410 and/or the operating system 1408 may be stored in the memory 1406 and may interface with the user and/or other devices to accept input and commands and, based on such input and commands and the instructions defined by the computer program 1410 and operating system 1408, to provide output and results.

Output/results may be presented on the display 1422 or provided to another device for presentation or further processing or action. In one embodiment, the display 1422 comprises a liquid crystal display (LCD) having a plurality of separately addressable liquid crystals. Alternatively, the display 1422 may comprise a light emitting diode (LED) display having clusters of red, green and blue diodes driven together to form full-color pixels. Each liquid crystal or pixel of the display 1422 changes to an opaque or translucent state to form a part of the image on the display in response to the data or information generated by the processor 1404 from the application of the instructions of the computer program 1410 and/or operating system 1408 to the input and commands. The image may be provided through a graphical user interface (GUI) module 1418. Although the GUI module 1418 is depicted as a separate module, the instructions performing the GUI functions can be resident or distributed in the operating system 1408, the computer program 1410, or implemented with special purpose memory and processors.

In one or more embodiments, the display 1422 is integrated with/into the computer 1402 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITHC, PLAYSTATION PORTABLE, etc.), touch tables, and walls (e.g., where an image is projected through acrylic and/or glass, and the image is then backlit with LEDs).

Some or all of the operations performed by the computer 1402 according to the computer program 1410 instructions may be implemented in a special purpose processor 1404B. In this embodiment, some or all of the computer program 1410 instructions may be implemented via firmware instructions stored in a read only memory (ROM), a programmable read only memory (PROM) or flash memory within the special purpose processor 1404B or in memory 1406. The special purpose processor 1404B may also be hardwired through circuit design to perform some or all of the operations to implement the present invention. Further, the special purpose processor 1404B may be a hybrid processor, which includes dedicated circuitry for performing a subset of functions, and other circuits for performing more general functions such as responding to computer program 1410 instructions. In one embodiment, the special purpose processor 1404B is an application specific integrated circuit (ASIC).

The computer 1402 may also implement a compiler 1412 that allows an application or computer program 1410 written in a programming language such as C, C++, Assembly, SQL, PYTHON, PROLOG, MATLAB, RUBY, RAILS, HASKELL, or other language to be translated into processor 1404 readable code. Alternatively, the compiler 1412 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1410 accesses and manipulates data accepted from I/O devices and stored in the memory 1406 of the computer 1402 using the relationships and logic that were generated using the compiler 1412.

The computer 1402 also optionally comprises an external communication device such as a modem, satellite link, Ethernet card, or other device for accepting input from, and providing output to, other computers 1402.

In one embodiment, instructions implementing the operating system 1408, the computer program 1410, and the compiler 1412 are tangibly embodied in a non-transitory computer-readable medium, e.g., data storage device 1420, which could include one or more fixed or removable data storage devices, such as a zip drive, floppy disc drive 1424, hard drive, CD-ROM drive, tape drive, etc. Further, the operating system 1408 and the computer program 1410 are comprised of computer program 1410 instructions which, when accessed, read and executed by the computer 1402, cause the computer 1402 to perform the steps necessary to implement and/or use the present invention or to load the program of instructions into a memory 1406, thus creating a special purpose data structure causing the computer 1402 to operate as a specially programmed computer executing the method steps described herein. Computer program 1410 and/or operating instructions may also be tangibly embodied in memory 1406 and/or data communications devices 1430, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1402.

Figure 15:
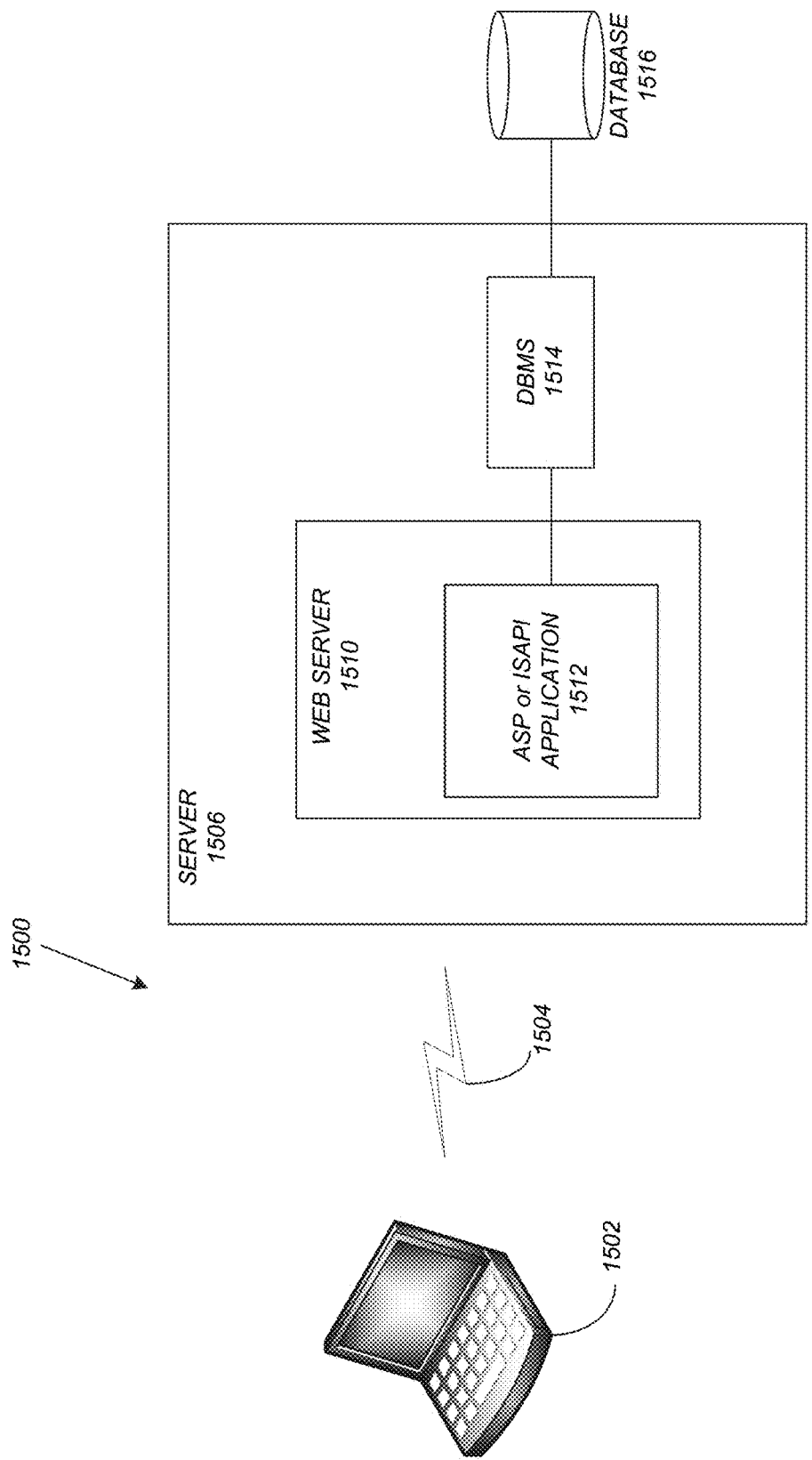
FIG. 15 schematically illustrates a typical distributed/cloud-based computer system using a network to connect client computers to server computers in accordance with one or more embodiments of the invention.

FIG. 15 schematically illustrates a typical distributed/cloud-based computer system 1500 using a network 1504 to connect client computers 1502 to server computers 1506. A typical combination of resources may include a network 1504 comprising the Internet, LANs (local area networks), WANs (wide area networks), SNA (systems network architecture) networks, or the like, clients 1502 that are personal computers or workstations (as set forth in FIG. 14), and servers 1506 that are personal computers, workstations, minicomputers, or mainframes (as set forth in FIG. 14). However, it may be noted that different networks such as a cellular network (e.g., GSM [global system for mobile communications] or otherwise), a satellite based network, or any other type of network may be used to connect clients 1502 and servers 1506 in accordance with embodiments of the invention.

A network 1504 such as the Internet connects clients 1502 to server computers 1506. Network 1504 may utilize ethernet, coaxial cable, wireless communications, radio frequency (RF), etc. to connect and provide the communication between clients 1502 and servers 1506. Further, in a cloud-based computing system, resources (e.g., storage, processors, applications, memory, infrastructure, etc.) in clients 1502 and server computers 1506 may be shared by clients 1502, server computers 1506, and users across one or more networks. Resources may be shared by multiple users and can be dynamically reallocated per demand. In this regard, cloud computing may be referred to as a model for enabling access to a shared pool of configurable computing resources.

Clients 1502 may execute a client application or web browser and communicate with server computers 1506 executing web servers 1510. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1502 may be downloaded from server computer 1506 to client computers 1502 and installed as a plug-in or ACTIVEX control of a web browser. Accordingly, clients 1502 may utilize ACTIVEX components/component object model (COM) or distributed COM (DCOM) components to provide a user interface on a display of client 1502. The web server 1510 is typically a program such as MICROSOFT'S INTERNET INFORMATION SERVER.

Web server 1510 may host an Active Server Page (ASP) or Internet Server Application Programming Interface (ISAPI) application 1512, which may be executing scripts. The scripts invoke objects that execute business logic (referred to as business objects). The business objects then manipulate data in database 1516 through a database management system (DBMS) 1514. Alternatively, database 1516 may be part of, or connected directly to, client 1502 instead of communicating/obtaining the information from database 1516 across network 1504. When a developer encapsulates the business functionality into objects, the system may be referred to as a component object model (COM) system. Accordingly, the scripts executing on web server 1510 (and/or application 1512) invoke COM objects that implement the business logic. Further, server 1506 may utilize MICROSOFT'S TRANSACTION SERVER (MTS) to access required data stored in database 1516 via an interface such as ADO (Active Data Objects), OLE DB (Object Linking and Embedding DataBase), or ODBC (Open DataBase Connectivity).

Generally, these components 1500-1516 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1502 and 1506 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1502 and 1506. Thus, embodiments of the invention may be implemented as a software application on a client 1502 or server computer 1506. Further, as described above, the client 1502 or server computer 1506 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

Cloud technology offers a new paradigm for media workflows that facilitates the decoupling of functionality into reusable microservices. Embodiments of the invention provide programmatic webform creation for user input that substantially reduces the software development effort. Further, orchestrating microservice calls empowers application developers with the ability to create media pipelines to increase reliability and productivity in a modern media company.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of using an application programming interface (API) for a cloud-based processing of media content, the method comprising:
   determining an API payload for the API to be utilized to process media content, the API payload including one or more variables;
   parsing the API payload to display the one or more variables of the API payload in a graphical user interface (GUI);
   receiving, via the GUI, a first user selection of a first variable of the API payload from the one or more variables of the API payload;
   presenting, via the GUI, in response to receiving the first user selection of the first variable of the API payload, a plurality of webform user interface elements;
   receiving, via the GUI, a second user selection of a first webform user interface element from the plurality of webform user interface elements;
   mapping, in response to receiving the second user selection, the first variable of the API payload to the first webform user interface element; and
   executing a job to:
      programmatically generate and present to an operator a webform comprising the first webform user interface element;
      receive, via the webform, data for the API payload; and
      provide the received data to the API for the cloud-based processing of the media content according to the received data for the API payload.

2. The computer-implemented method of claim 1, wherein determining the API payload comprises:
   identifying a cloud-based location for the API; and
   querying a service at the cloud-based location to determine the API payload.

3. The computer-implemented method of claim 1, wherein mapping the first variable of the API payload uses a point and click process.

4. The computer-implemented method of claim 1, wherein mapping the first variable of the API payload includes assigning input validation, layout, and styling.

5. The computer-implemented method of claim 1, wherein providing the received data to the API comprises invoking one or more reusable and scalable microservices that aggregate and transform the received data for the API payload.

6. The computer-implemented method of claim 1, wherein the job comprises one or more tasks, and the computer-implemented method further comprises:
   tracking a state of each of the one or more tasks;
   storing the state of each of the one or more tasks and a result of each of the one or more tasks; and
   presenting the state and the result of each of the one or more tasks in a dashboard of the GUI.

7. The computer-implemented method of claim 6, further comprising:
   receiving a submission of the job to be executed; and
   upon receiving the submission of the job to be executed, creating a new job record in a process orchestration application, wherein the new job record stores the state and the result of each of the one or more tasks.

8. The computer-implemented method of claim 7, further comprising:
   invoking an instance of a state machine upon receiving the submission of the job to be executed, wherein the state machine comprises one or more component steps that can be skipped or retried from a step framework via the dashboard.

9. The computer-implemented method of claim 1, further comprising:
   processing, using cloud-based computing, the media content according to the received data provided to the API.

10. The computer-implemented method of claim 7, further comprising:
   invoking an instance of a state machine upon submission of the job to be executed, wherein the state machine comprises a first component step and a second component step that each can be skipped or retried from a step framework via the dashboard;
   wherein each of the first component step and the second component step comprises:
      a service uniform resource locator (URL);
      one or more input parameters; and
      one or more output parameters,
   wherein the one or more input parameters of the second component step comprise the one or more output parameters of the first component step.

11. A computer-implemented system configured to use an application programming interface (API) for a cloud-based processing of media content, the comprising:
 a computer having a processor and a memory;
 the memory storing an application;
 the processor is configured to execute the application to:
  determine an API payload for the API to be utilized to process media content, the API payload including one or more variables;
  parse the API payload to display the one or more variables of the API payload in a graphical user interface (GUI);
  receive, via the GUI, a first user selection of a first variable of the API payload from the one or more variables of the API payload;
  present, via the GUI, in response to receiving the first user selection of the first variable of the API payload, a plurality of webform user interface elements;
  receive, via the GUI, a second user selection of a first webform user interface element from the plurality of webform user interface elements;
  map, in response to receiving the second user selection, the first variable of the API payload to the first webform user interface element; and
  execute a job to:
   programmatically generate and present to an operator a webform comprising the first webform user interface element;
   receive, via the webform, data for the API payload; and
   provide the received data to the API for the cloud-based processing of the media content according to the received data for the API payload.

12. The computer-implemented system of claim 11, wherein the processor is configured to execute the application to determine the API payload by:
 identifying a cloud-based location for the API; and
 querying a service at the cloud-based location to determine the API payload.

13. The computer-implemented system of claim 11, wherein the processor is configured to execute the application to map the first variable of the API payload using a point and click process.

14. The computer-implemented system of claim 11, wherein the processor is configured to execute the application to map the first variable of the API payload by:
 assigning input validation, layout, and styling.

15. The computer-implemented system of claim 11, wherein providing the received data to the API comprises one or more reusable and scalable microservices that aggregate and transform the received data for the API payload.

16. The computer-implemented system of claim 11, wherein the job comprises one or more tasks, and wherein the processor is further configured to execute the application to:
 track a state of each of the one or more tasks;
 store the state of each of the one or more tasks and a result of each of the one or more tasks; and
 present the state and the result of each of the one or more tasks in a dashboard of the GUI.

17. The computer-implemented system of claim 16, wherein the processor is further configured to execute the application to:
 receive a submission of the job to be executed; and
 upon receiving the submission of the job to be executed, create a new job record in a process orchestration application, wherein the new job record stores the state and the result of each of the one or more tasks.

18. The computer-implemented system of claim 17, wherein the processor is further configured to execute the application to:
 invoke an instance of a state machine upon receiving the submission of the job to be executed, wherein the state machine comprises one or more component steps that can be skipped or retried from a step framework via the dashboard.

19. The computer-implemented system of claim 11, wherein the processor is further configured to execute the application to:
 process, using cloud-based computing, the media content according to the received data provided to the API.

20. The computer-implemented system of claim 17, the processor is further configured to execute the application to:
 invoke an instance of a state machine upon submission of the job to be executed, wherein the state machine comprises a first component step and a second component step that each can be skipped or retried from a step framework via the dashboard;
 wherein each of the first component step and the second component step comprises:
  a service uniform resource locator (URL);
  one or more input parameters; and
  one or more output parameters,
 wherein the one or more input parameters of the second component step comprise the one or more output parameters of the first component step.

* * * * *